US008870664B2

(12) United States Patent
Leczek et al.

(10) Patent No.: US 8,870,664 B2
(45) Date of Patent: Oct. 28, 2014

(54) ELECTRONIC GAMING DEVICE AND ASSOCIATED IDENTIFICATION UNIT

(75) Inventors: Michael Leczek, Reifnitz (AT); Michael Gantner, Schruns (AT); Robert Kostenzer, Schruns (AT)

(73) Assignee: Michael Leczek, Reifnitz (AT)

( * ) Notice: Subject to any disclaimer, the term of this patent is extended or adjusted under 35 U.S.C. 154(b) by 128 days.

(21) Appl. No.: 13/511,025

(22) PCT Filed: Nov. 15, 2010

(86) PCT No.: PCT/AT2010/000438
§ 371 (c)(1),
(2), (4) Date: May 21, 2012

(87) PCT Pub. No.: WO2011/066593
PCT Pub. Date: Jun. 9, 2011

(65) Prior Publication Data
US 2012/0276977 A1 Nov. 1, 2012

(30) Foreign Application Priority Data
Dec. 4, 2009 (EP) .................................... 09450231

(51) Int. Cl.
*A63F 13/00* (2014.01)
*G07F 17/32* (2006.01)

(52) U.S. Cl.
CPC ........ *G07F 17/3239* (2013.01); *G07F 17/3211* (2013.01)
USPC ............................................... 463/46; 463/17

(58) Field of Classification Search
CPC . G07F 17/32; G07F 17/3202; G07F 17/3204; G07F 17/3206; G07F 17/3209; G07F 17/3211; G07F 17/322; G07F 17/3225; G07F 17/326; G07F 17/3269; G07F 17/3272
USPC ............ 463/17, 5, 10, 12, 13, 16, 22, 25, 30, 463/31, 36, 37, 46
See application file for complete search history.

(56) References Cited

U.S. PATENT DOCUMENTS

2007/0273670 A1 11/2007 Nordahl
2009/0093306 A1* 4/2009 Muir et al. ..................... 463/37
2009/0176547 A1* 7/2009 Katz .............................. 463/13

FOREIGN PATENT DOCUMENTS

EP 2000997 A1 12/2008
WO WO2007139484 A1 6/2007
WO WO2008045075 A2 4/2008

OTHER PUBLICATIONS

Youtube video of Micro Surface Demo @ CES 2008 Uploaded by BotJunkie Jan. 8, 2008 https://www.youtube.com/watch?v=Zxk_WywMTzc.*

(Continued)

*Primary Examiner* — Damon Pierce
*Assistant Examiner* — Jeffrey Wong
(74) *Attorney, Agent, or Firm* — Hoffmann & Baron, LLP

(57) ABSTRACT

The invention relates to an electronic gaming machine comprising at least one identification unit for a player, having a housing, a transmitter for wirelessly transmitting a unique identifier of the identification unit, and at least one touch sensor, which causes the transmitter to transmit the identifier when the housing is touched; and an electronic gaming device for a multi-player game, comprising a touchscreen for controlling the game and a receiver for wirelessly communicating with the identification units of the players; wherein the gaming device comprises a correlator, which correlates a contact of the touchscreen with an identifier of an identification unit received by the receiver of the gaming device over time in order to assign the contact to said identification unit.

21 Claims, 8 Drawing Sheets

(56) References Cited

OTHER PUBLICATIONS

EPO Search Report for priority application EP 09450231.7 dated Mar. 10, 2010.

International Search Report for PCT/AT2010/000438 dated Feb. 4, 2011.

Written Opinion of ISA for PCT/AT2010/000438 dated Oct. 4, 2011.

International Preliminary Report on Patentability issued in PCT/AT2010/000438 on Jun. 5, 2012.

* cited by examiner

ELECTRONIC GAMING DEVICE AND ASSOCIATED IDENTIFICATION UNIT

CROSS-REFERENCE TO RELATED APPLICATIONS

This application is a National Phase application of International Application No. PCT/AT2010/000438 filed Nov. 15, 2010 which claims the priority of European Patent Application No. 09 450 231.7 filed Dec. 4, 2009, the disclosures of which are incorporated herein by reference.

BACKGROUND

The present invention relates to an electronic gaming machine comprising a gaming device for a multi-player game, with a touchscreen for controlling the game and a receiver for wirelessly communicating with the identification units of the players, and also an identification unit for interacting with such a gaming device.

The use of wireless identification units, so-called player tracking dongles, e.g. with integrated RFID transponder chips, for player identification and tracking in casinos has been known for a long time, see patents U.S. 2007/0060310 A1 or U.S. 2007/0293311 A1, for example. Recently it has been proposed to also use such RFID transponder chips for the identification and assignment of individual players to a touchscreen of an electronic multi-player live table game jointly operated by them. Thus, patent EP 2 000 997 A1 describes the identification and localisation of the players on a touchscreen gaming table by radio localisation of the RFID transponder chips carried by them, whereupon each localised player is allocated his/her own area of the touchscreen, so that the touches of the players can be distinguished between on the touchscreen. This solution is only suitable for specific types of live table games, in which the players use their own areas on the gaming table, such as poker, blackjack or the like. This system is not suitable for freer live table games, in which an area of the touchscreen is used jointly by multiple players, e.g. the betting area of a virtual roulette table. Another solution is described in WO 2007/139484 A1, in which each player grasps a dedicated weak current electrode in one hand, so that the other hand carries a weak coding signal and its touch on the touchscreen can be assigned to the grasped electrode. This system requires a one-handed method of play for the players with correspondingly low user acceptance.

SUMMARY

Therefore, there is an ongoing demand for a practicable solution without limitation for playing electronic multi-player games on touchscreen-controlled gaming devices.

This aim is achieved in a first aspect of the invention with an electronic gaming machine of the aforementioned type, which is distinguished according to the invention by: at least one identification unit for a player, with a housing, a transmitter for wirelessly transmitting a unique identifier of the identification unit and at least one touch sensor, which causes the transmitter to transmit the identifier when the housing is touched; and an electronic gaming device for a multi-player game, with a touchscreen for controlling the game and a receiver for wirelessly communicating with the identification units of the players; wherein the gaming device has a correlator, which correlates a touch of the touchscreen with an identifier of an identification unit received by the receiver of the gaming device over time in order to assign the touch to this identification unit.

In this way, a joint operation for multiple players of a touchscreen gaming field that allows the individual touches ("user inputs") of the players to be quickly and reliably distinguished between is possible for the first time without the players being required to change their gaming behaviour or the gaming device being restricted to specific types of games.

By the selective transmission of its identifier, the identification unit of the invention enables the touches made on the touchscreen of the gaming device to be uniquely assigned to the respective player only when the touch sensor detects a touch. Thus, the identification unit according to the invention constitutes a completely new type of "betting tool", also referred to here as electronic betting tool (EBT), with which a player can place bets and/or perform other game inputs assigned to him/her. Since the identification unit according to the invention at the same time also identifies the player in the manner of a conventional player tracking dongle, all conventional functions of computerised cash flow monitoring in casinos can also be performed, such as running an individual credit or winnings account in the gaming device or a central system of the casino, providing cash back for individual players, placing player-specific personal favourite bets, drawing up player and/or game statistics etc.

If desired, the identification unit of the invention itself can also be used as an account management device (electronic purse) for the player, e.g. by integrating a storage unit into the identification unit to be able to record and manage credit status and/or states of play in the identification unit itself. For this, the identification unit can be equipped with an optional display, on which various information can be read.

The term "touchscreen" used here covers touchscreens both with and without screen displays, i.e. both input-only screens with touch-sensitive surface in the manner of a graphics tablet or touchpad and combined in- and output screens in the manner of a display with touch-sensitive surface. In the simplest case, the touchscreen only detects the occurrence of a touch, which may be sufficient for simple games. In a preferred variant, the touchscreen also evaluates the position of the touch and uses it to control the game, which enables more complex games to be played, e.g. roulette. For example, the touchscreen can represent the betting area of a roulette table with the individual betting fields (number segments "0" to "36", group segments "rouge", "noir", "pair", "impair" etc.), e.g. statically printed thereon. In the particularly preferred variant of a touchscreen with touch-sensitive display the betting fields can also be displayed dynamically, e.g. dependent on the state of play.

It is particularly preferred if the touchscreen is a multi-touch-capable touchscreen, which simplifies the discrimination or identification of simultaneous touches.

According to a preferred embodiment of the invention, the correlator discards simultaneous touches and/or simultaneously received identification unit identifiers. This increases the security against interference and in many applications poses no appreciable restriction, since such situations are extremely infrequent with sufficiently high time resolution of the time correlation. A player whose input is ignored in this way will generally simply try a new input (touch) to cause an appropriate control of the gaming device, which can also be displayed e.g. acoustically or optically directly on the touchscreen for him/her by a corresponding feedback of the gaming device.

Instead of discarding simultaneous touches or identifiers, these can be evaluated and assigned with the aid of the following further developments of the invention based on a gaming machine equipped with a multitouch-capable touchscreen.

For this, according to a first preferred variant, the identification unit has a locating circuit for determining its approximate location area over the touchscreen and its transmitter also transmits the current location area when transmitting the identifier, wherein the correlator compares the received location areas for approximately simultaneous touches and/or approximately simultaneously received identifiers with the positions of the touches and when the position of a touch falls within a location area of an identification unit assigns this touch to this identification unit.

In this way, the identification unit provides a "rough locating" of its own position, on the basis of which simultaneous touches or identifiers can be further distinguished from one another.

The locating circuit preferably determines its location area by phase or transit-time measurements in radio, optical or sound fields emitted by the gaming device. The gaming device has appropriate transmitter units for this to generate such orientation fields over the touchscreen.

Alternatively, the identification unit can also determine its location area without the aid of the gaming device, e.g. by stand-alone locating in the radio field of a mobile radio system, WLAN etc. or preferably by satellite navigation, e.g. GPS. dGPS (differential GPS) is preferably used, which achieves a locating accuracy in the centimeter range by using a stationary reference receiver that provides a reference signal.

The said "rough locating" of the identification unit can, however, also be performed from the gaming device in that the gaming device has a locating receiver for locating the identification unit transmitting its identifier to an approximate location area of the identification unit of this identifier over the touchscreen, wherein the correlator compares the thus located location areas for approximately simultaneous touches and/or approximately simultaneously received identifiers with the positions of the touches and when the position of a touch falls within a location area of an identification unit assigns this touch to this identification unit.

For this, the locating receiver can preferably have multiple distributed receiving antennas in order to determine the location area of the identification unit by phase or transit-time measurements on the transmissions of its identifiers.

A further alternative is that the identifier of the identification unit is additionally optically coded on its housing and the locating receiver has a camera in order to determine the location area of the identification unit by detection of the optical coding in a camera image.

It is particularly advantageous in each variant if the gaming device also has a transmitter and transmits an identifier of the touchscreen and the receiver of the gaming device for an identification unit identifier also receives a touchscreen identifier transmitted back by the identification unit, and the identification unit also has a receiver, which receives the identifier of a touchscreen, and the transmitter of the identification unit also transmits the received touchscreen identifier on transmission of the identification unit identifier, wherein the correlator only correlates with the touches those identification unit identifiers whose received touchscreen identifier matches the previously transmitted touchscreen identifier. As a result, systems can be formed with more than one touchscreen in a gaming device or with multiple gaming devices in a room without the risk of mutual interference.

It is particularly favourable if the receiver receives the touchscreen identifier only upon action of the touch sensor, as a result of which the power consumption of the receiver in the identification unit can be minimised.

An embodiment with a particularly low susceptibility to interference is distinguished in that the receiver receives the touchscreen identifier on a first radio frequency and the transmitter transmits the identification unit identifier and the touchscreen identifier on a second radio frequency.

The touchscreen is preferably configured in the form of a gaming table and it is particularly preferred if the multi-player game is a live table game such as roulette, poker, blackjack, baccarat or the like.

The housing of the identification unit of the invention can be configured in any desired form, e.g. in the form of a ballpoint pen, a key tag, a credit card or the like. It is particularly advantageous if the housing is in the form of a conventional gaming chip with the touch sensor located on its outer periphery. This enables particularly good handling and operation of the touch sensor. The player can grasp the chip on the opposing flat sides between his/her thumb and index finger in a conventional manner, so that the peripheral edge of the gaming chip projects between the thumb and index finger, and can comfortably touch the touchscreen with this outer periphery and thus activate the touch sensor.

The touch sensor is preferably formed by one or more pressure switches, which provide tactile feedback to the user upon operation. As a result, the rotation position of the gaming chip is immaterial during operation and the user can still be sure that he/she has performed the touch (user input) on the touchscreen.

Alternatively, the touch sensor can be a shock sensor, which is arranged in the housing of the identification unit. A touch of the touchscreen with the identification unit is always associated with a slight shock of the identification unit, which can be measured by means of a shock sensor and used as activation criterion for the transmission of the identifier.

BRIEF DESCRIPTION OF THE DRAWINGS

The invention shall be explained in more detail below on the basis of an exemplary embodiment represented in the attached drawings.

DETAILED DESCRIPTION

Figure 1:
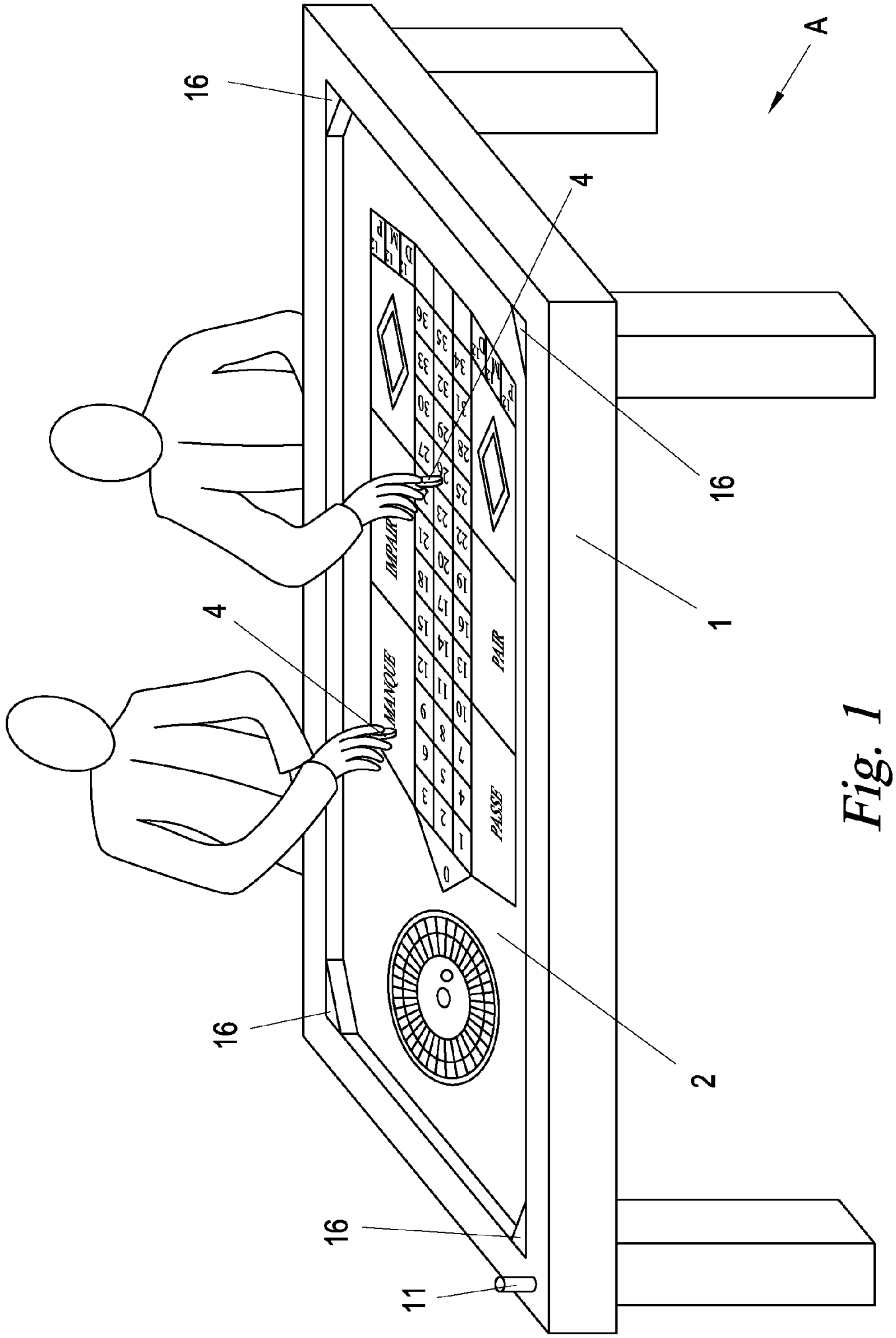
FIG. 1 is a schematic perspective view of the gaming machine of the invention in the position of use.
Figure 2:
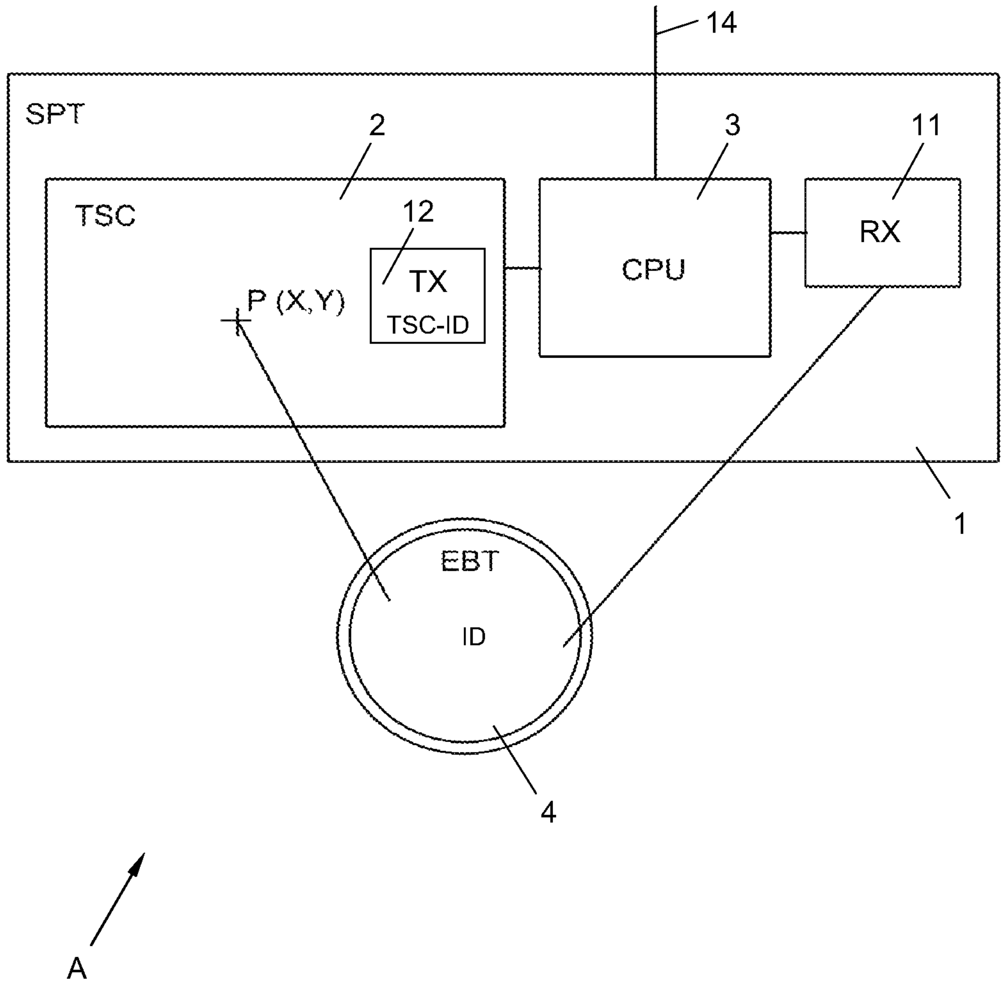
FIG. 2 is a block diagram of the gaming machine of FIG. 1 comprising the electronic gaming device and an exemplary identification unit.

FIGS. 1 and 2 schematically show an electronic gaming device 1, e.g. an electronic roulette table, with a touchscreen 2 for controlling an processing unit 3, on which corresponding gaming software runs. The touchscreen 2 constitutes the in- and output unit of the processing unit 3 to display states of play, game results and touchable input fields on its screen surface and also to detect touches of the screen surface by the players. In this case, the touchscreen 2 in particular also determines the coordinates X, Y of the touch points P to thus control the entire gaming device 1 or the gaming software running on the processing unit 3, as known in the art.

Figure 3:
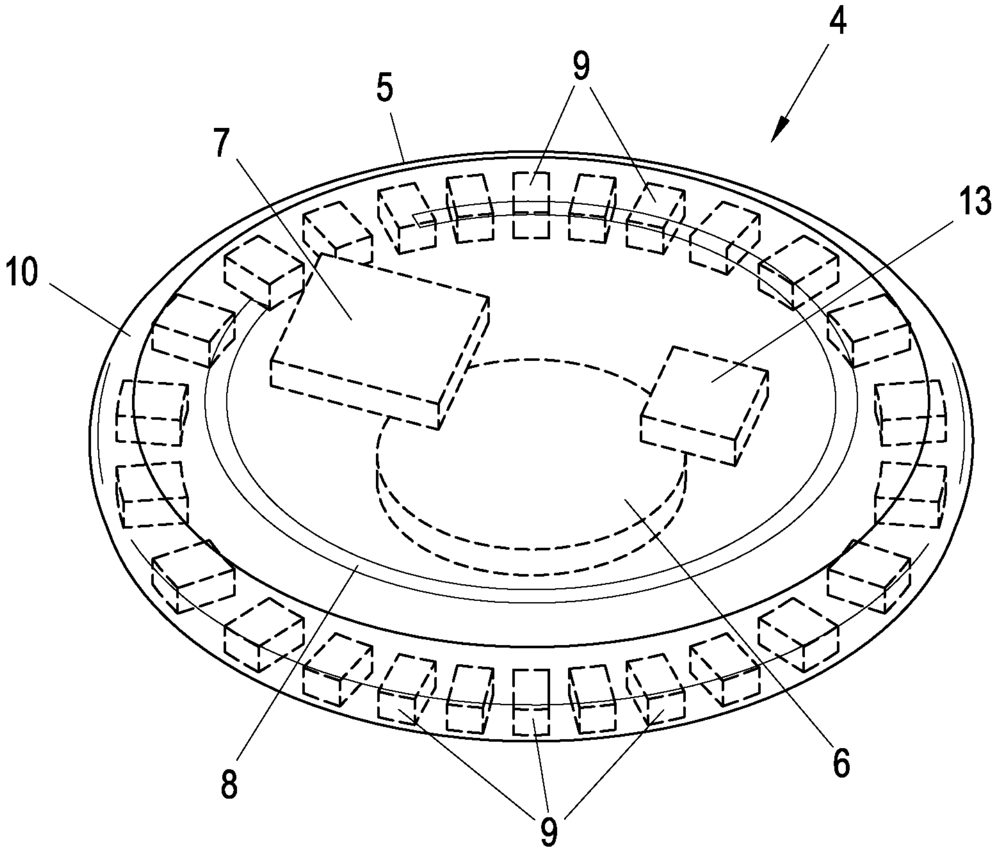
FIGS. 3 to 5 show the identification unit of the gaming machine of FIGS. 1 and 2 in perspective view, an open plan view and in sectional view.
Figure 4:
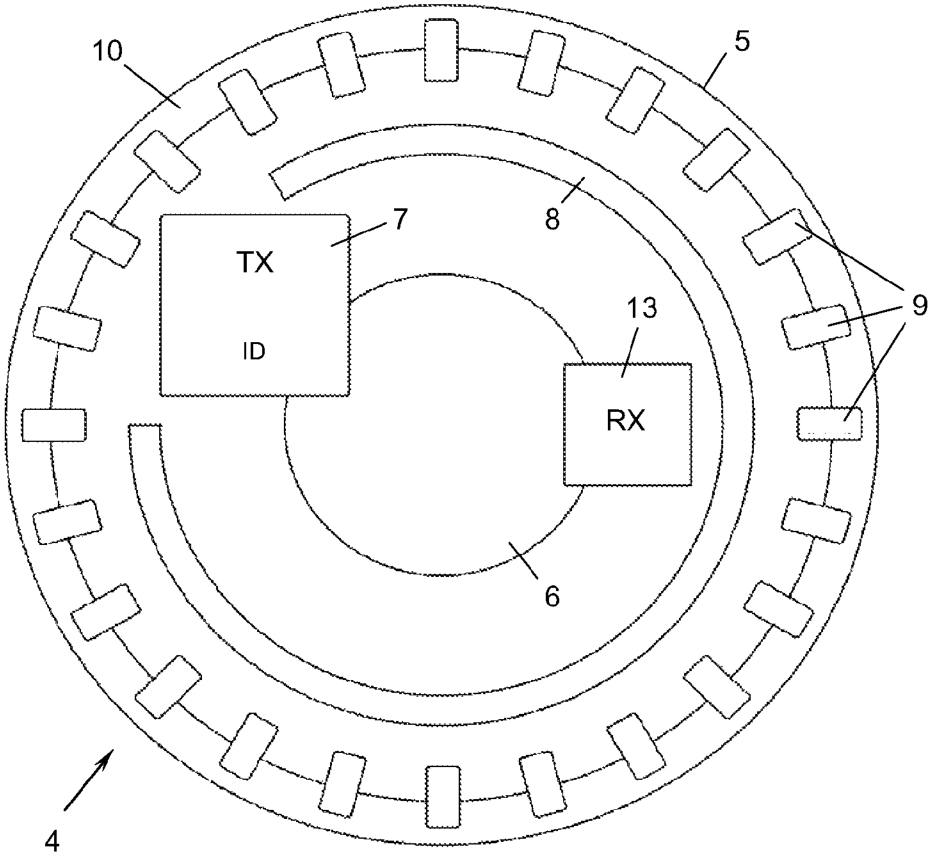
Figure 5:
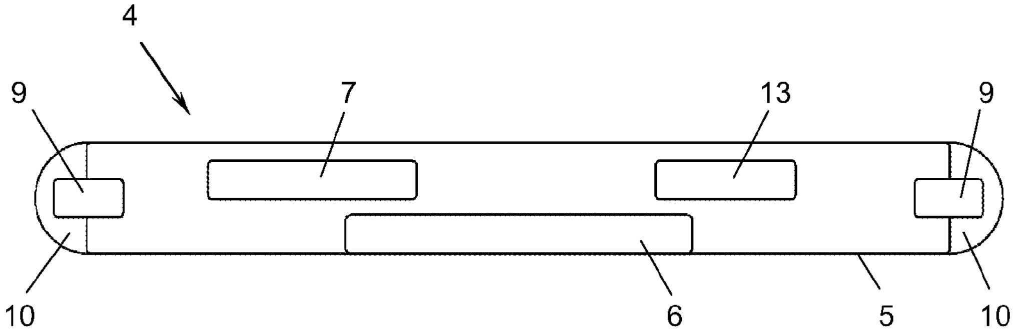

Each player on the gaming device 1 is provided with an identification unit 4, the structure of which is shown schematically in FIGS. 3 to 5—without the electrical connections between the components that are well known to the person skilled in the art. The gaming device 1 and the identification units 4 together form an electronic gaming machine A.

In the preferred embodiment shown the identification unit 4 has a housing 5 in the form of a usual coin-like gaming chip, which contains a transmitter 7 supplied by a battery 6 with an antenna 8 for transmitting a unique identifier ID of the identification unit 4. The transmitter 7 is controlled by a touch sensor 9 arranged on the outer surface of the housing 5 so that it only transmits the identification unit identifier ID when the touch sensor 9 is touched.

The touch sensor 9 can be configured in any desired manner, e.g. as an inductive, capacitive, optical or radio sensor. In the preferred embodiment shown the touch sensor 9 is formed by a plurality of pressure switches, which are electrically connected in parallel and distributed over the outer periphery of the housing 5 and which provide the user with tactile feedback when operated.

The pressure switches 9 can be covered by a circumferential rubber lip 10, so that the identification unit 4 is in the form of a conventional gaming chip with circumferential rubber edge. At least one pressure switch 9 is operated by pressing the lip 10 radially inwards at any desired point on the circumference of the housing 5 and thus causes transmission of the identification unit identifier ID by the transmitter 7.

Alternatively, the touch sensor 9 can also be formed by a shock sensor, e.g. a semiconductor acceleration sensor (gyro sensor), arranged in the interior of a housing 5. Touching the touchscreen 2 with the identification unit 4 means an "impact"—albeit extremely slight—for this, which can be detected or measured with such a shock sensor to then activate the transmitter 7 to transmit the identifier ID.

The transmitter 7 could also be formed by the transmitter part of a conventional RFID transponder chip, which when a touch 9 on the touchscreen 2 is detected, is scanned by a receiver 11 of the gaming device 1 configured for RFID transponder scans and at the same time is supplied with energy via its antenna 8. In this case, the touch sensor 9 controls the RFID transport chip 7 so that it responds with the identification unit identifier ID when the touch sensor 9 is operated simultaneously (or directly before or afterwards).

Returning to FIGS. 1 and 2, the interaction of the identification unit 4 with the gaming device 1 in the gaming machine A is as follows. The touchscreen 2 is touched at any desired location using the identification unit 4. The touchscreen 2 transmits the position P(X,Y) of the touch location to the processing unit 3. At the same time, the identification unit 4, controlled by its touch sensor 9, transmits its identifier ID to the receiver 11, which forwards this to the processing unit 3.

The processing unit 3 now acts as a correlator and correlates the touch information P(X,Y) received from the touchscreen 2 with the identification unit identifier ID received from the receiver 11 with respect to time coincidence: an identification unit identifier ID received simultaneously—or within given tolerances shortly before or after—a touch P(X, Y) is assigned to this touch P(X,Y). For this, the touches P(X,Y) and identification unit identifiers ID can be provided with respective exact time stamps of a system-wide clock cycle to assure an exact time correlation even in the case of delayed processing in the processing unit 3.

Figure 6B:
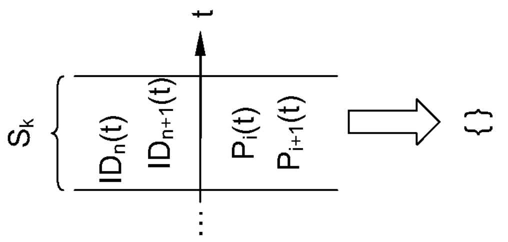
FIGS. 6*a* and 6*b* show the principle of time correlation of identification unit identifiers and touchscreen touches in a timing pattern predetermined by the time resolution limits of the system.
Figure 6A:
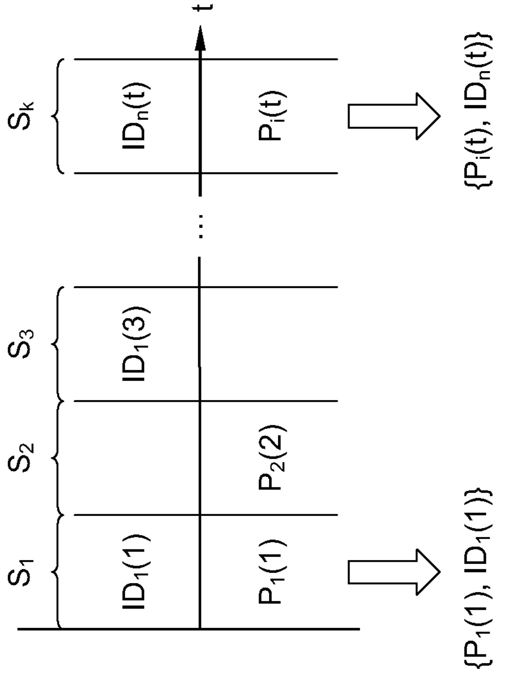

FIGS. 6*a* and 6*b* show the principle of the time correlation in detail. The time resolution limits of the system, which in practice are those of the touchscreen 2 in particular concerning the resolution capability for consecutive touches P, and/or those of the processing unit 3 as correlator, are illustrated by time slots $S_1$, $S_2$, $S_3$ etc., in general $S_k$, of a timing pattern. For example, modern multitouch-capable touchscreens can detect up to 20 points simultaneously every 5 ms, the width of a time slot $S_k$ amounting to 5 ms in this case.

FIG. 6*a* firstly shows the case where either only one or no identifier ID, in general "$ID_n$", or touch P(X,Y), in general "$P_i$" occurs. For example, in the time slot $S_1$ a touch $P_1(\mathbf{1})$ is detected and—within the time limits of the time slot $S_1$—an identification unit identifier $ID_1(\mathbf{1})$ is received. The processing unit 3 thus assigns this touch and this identifier to one another, which assignment or correlation is represented here by the pairing $\{P_1(\mathbf{1}),ID_1(\mathbf{1})\}$, in general $\{P_n(\mathbf{1}),ID_n(\mathbf{1})\}$ in the time slot $S_k$.

As a further example, time slot $S_2$ shows a touch $P_1(\mathbf{2})$, for which no identification unit identifier $ID_n$ at all has been received; and time slot $S_3$ shows a received identifier $ID_1(\mathbf{3})$, for which there is no touch $P_i$ present.

In this way, touches of multiple players on one and the same touchscreen 2 can be respectively assigned correctly to the individual players. If the touchscreen 2 represents the betting area of a virtual roulette table, for example, then any desired number of players can place bets at any desired time points by tapping a virtual betting field of the touchscreen 2 with their identification unit 4. The gaming software can then actuate the display part of the touchscreen, for example, so that the identifier $ID_n$ or information or a graphic assigned to this, e.g. player colour or number, is displayed at the tapped position, e.g. in the tapped betting field.

If the clock frequency of the processing unit 3 is correspondingly high and the transmission times of the identifiers are correspondingly short, a high time resolution, i.e. narrow time slots $S_k$, of the time correlation between the touches P(X,Y), on the one hand, and the identifiers ID, on the other hand, can be achieved. As a result it is extremely unlikely in practice that two touches P(X,Y) or $P_i(t)$ or identification unit identifiers ID or $ID_n(t)$ will ever occur simultaneously—in the time resolution limits $S_k$ of the system. However, should this actually ever be the case, the processing unit 3 discards these results that can no longer be uniquely assigned. FIG. 6*b* shows this case: such "simultaneous", i.e. that fall within the same time slot $S_k$, identifiers $ID_n(t)$, $ID_{+1}(t)$ and/or touches $P_i(t)$, $P_{i+1}(t)$ are discarded; their correlation gives no or an "empty" result { }.

FIGS. 7 to 10 show further embodiments of the gaming machine A, which allow simultaneous touches and/or identifiers to be evaluated and assigned to one another.

Figure 7B:
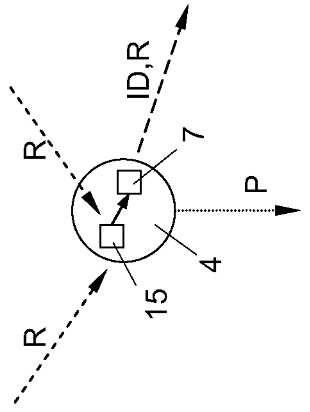
FIGS. 7*a*, 7*b*, 8*a* and 8*b* are block diagrams of further embodiments of the gaming machine of the invention.
Figure 7A:
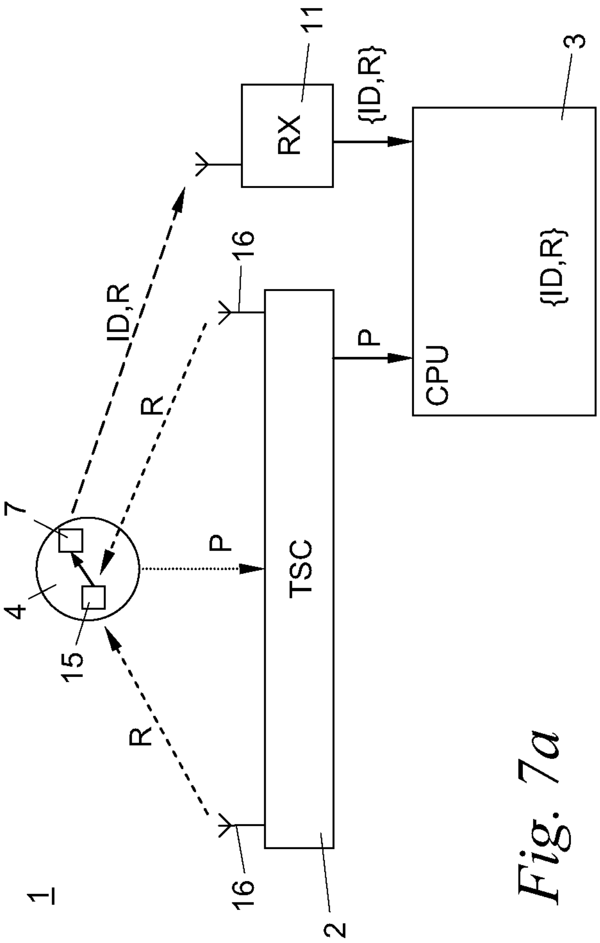
Figure 10:
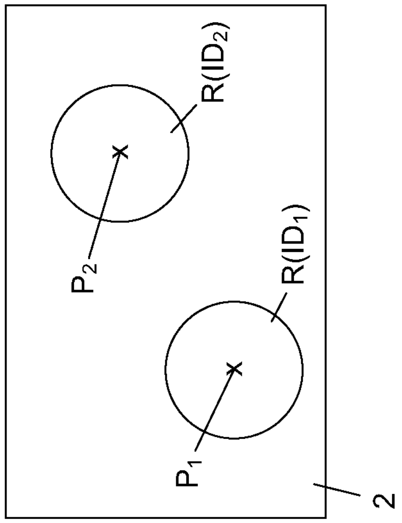
FIG. 10 is a plan view onto the touchscreen of the gaming device with exemplary touch positions for illustration of the principle of FIG. 9.

For this purpose, in the embodiment represented in FIGS. 7*a* and 7*b* the identification unit 4 is provided with a locating circuit 15, which can determine the approximate location area R (FIG. 10) of the identification unit 4 over the touchscreen 2. The location area R is "approximate" in that it is less exact than the touch positions P(X,Y) or $P_i(t)$, which the touchscreen 2 can determine itself to the exact pixel. The location area $R(ID_n)$ of the identification unit 4 with the identifier $ID_n$ determined by the locating circuit 15 therefore always lies around the touch position $P_i$ measured by the touchscreen 2. The location areas R are not necessarily round, as shown in FIG. 10, but can have any desired peripheral shape, e.g. oval, in the form of a polygon, lobe or any other shape.

The locating circuit 15 can determine the location area R of the identification unit 4, for example, on the basis of phase or transit-time measurements in radio, optical or sound fields, which are emitted by the gaming device 1. For example, the gaming device 1 can have multiple radio, optical or sound transmitters 16 spaced from one another, e.g. distributed around the touchscreen 2 (see FIG. 1), the signals of which are evaluated by the locating circuit 15 accordingly. Reception level measurements could also be conducted instead of phase or transit-time measurements.

FIG. 7*b* shows an alternative variant of the locating circuit 15, in which this utilises external radio fields, e.g. of satellite navigation or mobile radio systems, WLAN networks etc. For example, the locating circuit 15 could be a GPS receiver, in particular a differential GPS receiver (dGPS), which allows a position determination to the precise centimeter by using stationary reference transmitters.

The location areas R of the identification unit 4 determined by the locating circuit 15 are now co-transmitted by the transmitter 7 of the identification unit 4 when it transmits an identifier ID, see pairing {ID,R}. The receiver 11 of the gaming device 4 receives the pairing {ID,R} and directs it to the correlator 3, which then performs a "refined" time correlation as follows.

Figure 9:
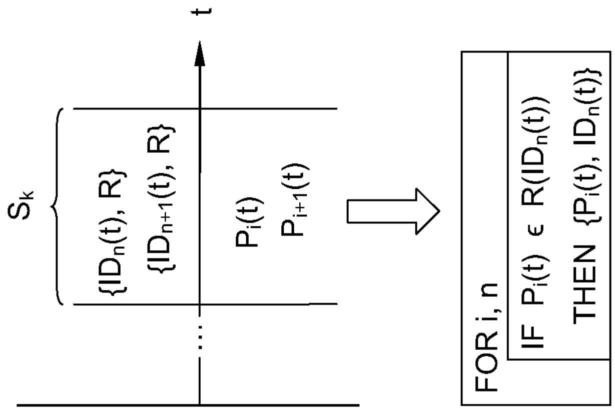
FIG. 9 shows a refined principle of the time correlation of identification unit identifiers and touchscreen touches using the embodiments of FIGS. 7*a*, 7*b*, 8*a* and 8*b*.

The principle of the refined time correlation is illustrated in FIGS. 9 and 10: for multiple pairings $\{ID_n(t),R\}$, $\{ID_{n+1}(t),R\}$ received in a time slot $S_k$ and/or multiple touches $P_i(t)$, $P_{i+1}(t)$ detected in a time slot $S_k$ it is respectively checked whether the position X, Y of a touch $P_i$ falls within one of the location areas R from pairings $\{ID_n,R(ID_n)\}$, and if this is the case, this touch $P_i(t)$ is assigned to the identifier $ID_n(t)$ of the pairing with this location area R:

$$\text{IF } P_i(t)R(\text{ID}_n(t))\text{THEN } \{P_i(t),\text{ID}_n(t)\}$$

In this way, simultaneous touches or identifiers, i.e. those received in the same time resolution limits $S_k$, can be assigned to one another as long as the identification units 4 do not come so close to one another that the location areas R start to overlap with respect to a touch P(X,Y).

Figure 8B:
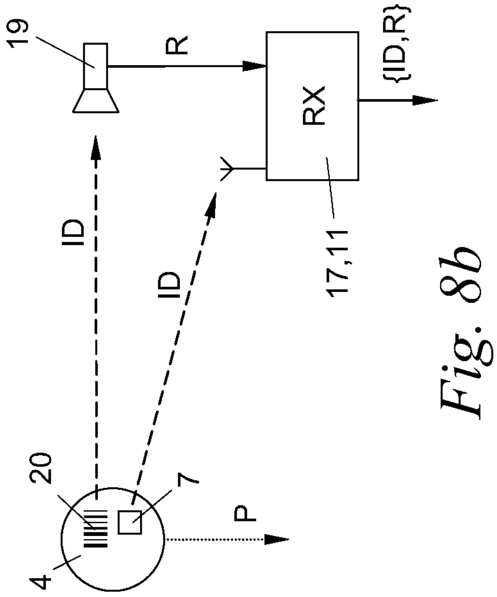
Figure 8A:
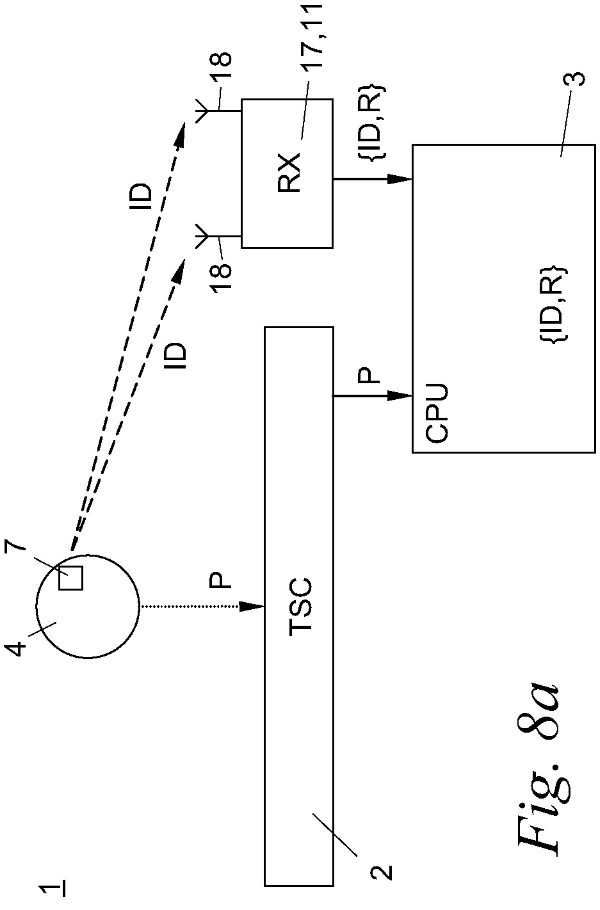

FIGS. 8*a* and 8*b* show an alternative embodiment to achieve the refined time correlation functionality of FIGS. 9 and 10. Here, the identification unit 4 does not have a locating circuit 15, but the gaming device 1 has a locating receiver 17, which at the same time can form the receiver 11, for example. Here, the locating receiver 17 again undertakes the rough locating of the identification units 4 to the location areas R, and the touchscreen 2 undertakes the fine locating to determine the touch positions P(X,Y).

For example, the locating receiver 17 can have multiple locally distributed receiving antennas 18, by means of which the location area R of an identification unit 4 can be determined from the transmissions of the identifiers ID by phase, transit-time and/or received field strength measurements. The locating receiver 17 again combines the received identifier ID with the location area R located by it to form a pairing {ID,R}, and the further method of operation is as described above.

FIG. 8*b* shows an alternative embodiment of the locating receiver 17 of the gaming device 1. Here, the locating receiver 17—which again also assumes the function of the receiver 11—has a camera 19, which optically captures the area over the touchscreen 2. The identification units 4 additionally carry their identifier ID on their outer surface as an optical coding 20, e.g. in the form of a one- or two-dimensional bar code or a colour coding. The camera 19 records the optical coding 20 and thus its approximate location area R at the same time. The locating receiver 17 assigns the location area R of an identical identifier ID transmitted by the transmitter 7 to again generate the pairing {ID,R} for the previously explained correlation of the processing unit 3.

The receiver 11 of the gaming device 1 can be constantly in receive mode to be able to receive identifiers ID of identification units 4 at any time, in particular if these have a spontaneously transmitting transmitter 7 activated by their touch sensor 9. Alternatively, the receiver 11 could also be a transceiver transmitting transponder scans to interact with transmitters 7 in the form of RFID transponder chips and then be controlled by the processing unit 3 so that when a touch P(X,Y) occurs it prompts all identification units 4 located in the vicinity to respond, wherein only that identification unit 3 whose touch sensor 7 is currently being operated or has just been operated responds.

In a further embodiment the gaming device 1 has a transmitter 12, which transmits a unique identifier TSC-ID of the gaming device 1 and/or the touchscreen 2, if this has multiple touchscreens 2. The transmitter 12 can also be combined with the receiver 11 to form a transceiver. The transmitter 12 can continuously transmit the identifier TSC-ID or only transmit it during the course of a communication with an identification unit 4.

The identification units 4 in this embodiment have a receiver 13, which could also be combined with the transmitter 7 to form a transceiver, evaluate the touchscreen identifier TSC-ID received from the receiver 13 during the course of a touch of the touch sensor 9 and transmit this linked with the identification unit identifier ID back to the gaming device 1. This increases the security against interference when multiple touchscreens 2 or multiple gaming devices 1 are operated next to one another: in the time correlation of the touches P(X,Y) with the identification unit identifiers ID the processing unit 3 then only takes into consideration those identifiers ID, for which the correct touchscreen identifier TSC-ID of the touched touchscreen 2 has also been received.

The wireless communication between the transmitters 7, 12 and receivers 11, 13, 17 can be conducted in any manner known in the art, e.g. by optical, inductive, capacitive or other methods. A radio communication, in particular which is digital and according to an industrial standard such as WLAN (wireless local area network), NFC (near field communication), DSRC (dedicated short-range communication), Bluetooth or the like, is preferably used. Use of the RFID (radio frequency identification) standard is particularly preferred. In the case of bidirectional radio transmissions, different radio frequencies can also be used for the two directions of communication in order to increase security against interference.

Multiple gaming devices 1 of the type shown here can be linked to gaming devices 1 of the same type via a network interface 14 in a conventional manner and/or be connected to a computing centre of the casino, in which financial accounts of the players and/or game statistics can be kept, for example. In this case, the identification unit identifiers ID of the identification units 4 of the players can also be used to reference the players' accounts and for player-related evaluations such as player track records, as is known in the art.

If desired, the identification unit 4 can also be equipped with a display device to display various information, e.g. concerning its operating status, the progress of its communication with the gaming device 1, concerning internal data such as a credit level stored therein if it serves as an electronic purse, for example, or concerning external data taken from the gaming device or the casino computing centre, which are referenced by the identification unit 4. Optionally, a keyboard (preferably limited to few keys) can also be provided on the identification unit 4 for data input and communication with these units.

Consequently, the invention is not restricted to the represented embodiments, but covers all variants and modifications that fall within the scope of the attached claims.

The invention claimed is:

1. An electronic gaming machine comprising:

at least one identification unit carried by a player, the identification unit comprising a housing, a transmitter for wirelessly transmitting a unique identifier of the identification unit and at least one touch sensor which causes the transmitter to transmit the identifier when the housing is touched to a touchscreen; and an electronic gaming device for a multi-player game, the electronic gaming device comprising the touchscreen for controlling the game and a receiver for wirelessly communicating with the identification units of the players;

wherein the gaming device includes a correlator, which correlates a time associated with a touch of the touchscreen by the identification unit with a time associated with an identifier transmitted by the identification unit and received by the receiver of the gaming device in order to assign the touch of the touchscreen to the identification unit of the player.

2. An electronic gaming machine according to claim 1, wherein the touchscreen evaluates the position of the touch location and uses it to control the game.

3. An electronic gaming machine according to claim 2, wherein the touchscreen is a multitouch-capable touchscreen.

4. An electronic gaming machine according to claim 3, wherein the identification unit further comprises a locating circuit for determining an approximate location area of the identification unit over the touchscreen and the transmitter also transmits the current location area when transmitting the identifier, wherein for approximately simultaneous touches of the touchscreen or approximately simultaneously received identifiers, the correlator compares the received location areas with the positions of the respective touches and, when the position of one of these touches falls within the respective location area of the respective identification unit, assigns this touch to this identification unit.

5. An electronic gaming machine according to claim 4, wherein the locating circuit determines its location area by phase or transit-time measurements in radio, optical or sound fields emitted by the gaming device by means of transmitter units.

6. An electronic gaming machine according to claim 4, wherein the locating circuit determines its location area by means of transmitter units using satellite navigation.

7. An electronic gaming machine according to claim 3, wherein the gaming device further comprises a locating receiver for locating an identification unit, which is just transmitting its identifier, to an approximate location area of this identification unit over the touchscreen, wherein for approximately simultaneous touches of the touchscreen or approximately simultaneously received identifiers, the correlator compares the located location areas with the positions of the respective touches and, when the position of one of these touches falls within the respective location area of the respective identification unit, assigns this touch to this identification unit.

8. An electronic gaming machine according to claim 7, wherein the locating receiver has multiple distributed receiving antennas in order to determine the location area of the identification unit by at least one of phase and transit-time measurements on the transmissions of its identifiers.

9. An electronic gaming machine according to claim 7, wherein the identifier of the identification unit is additionally optically coded on its housing and the locating receiver has a camera in order to determine the location area of the identification unit by detection of the optical coding in a camera image.

10. An electronic gaming machine according to claim 1, wherein the correlator discards simultaneous touches of the touchscreen.

11. An electronic gaming machine according to claim 1, wherein the gaming device further comprises a transmitter and transmits an identifier of the touchscreen and the receiver of the gaming device for an identification unit identifier also receives a touchscreen identifier transmitted back by the identification unit, wherein the identification unit further comprises a receiver, which receives the identifier of a touchscreen, and the transmitter of the identification unit also transmits the received touchscreen identifier on transmission of the identification unit identifier, wherein the correlator only correlates with the touches those identification unit identifiers whose received touchscreen identifier match the previously transmitted touchscreen identifier.

12. An electronic gaming machine according to claim 1, wherein the touchscreen is configured in the form of a multiplayer gaming table.

13. An electronic gaming machine according to claim 12, wherein the multiplayer gaming table comprises at least one of a roulette, poker, blackjack and baccarat live table game.

14. An electronic gaming machine according to claim 1, wherein the housing of the identification unit is in the form of a gaming chip with the touch sensor located on its outer periphery.

15. An electronic gaming machine according to claim 1, wherein the touch sensor is formed by one or more pressure switches, which provide tactile feedback to the user upon operation.

16. An electronic gaming machine according to claim 1, wherein the touch sensor is a shock sensor, which is arranged in the housing of the identification unit.

17. An electronic gaming machine according to claim 1, wherein the touch of the touchscreen and the identifier transmitted by the identification unit are provided with time stamps from a system-wide clock cycle for time correlation.

18. An electric gaming machine according to claim 1, wherein a touch of the touchscreen transmits a position of the touch location to a processing unit and the receiver is electronically coupled to the processing unit.

19. An electronic gaming machine according to claim 18, wherein the processing unit comprises the correlator.

20. An electronic gaming machine according to claim 19, wherein a clock frequency of the processing unit is correspondingly high and the transmission times of the identification units are correspondingly short to provide high time correlation resolution.

21. An electronic gaming machine according to claim 1, wherein the correlator discards simultaneously received identifiers.

* * * * *